US006967934B1

(12) United States Patent
Kockmann et al.

(10) Patent No.: US 6,967,934 B1
(45) Date of Patent: Nov. 22, 2005

(54) RADIO INTERFACE FOR A SMALL WIRELESS INSTALLATION IN THE 2.4 GHZ ISM BAND

(75) Inventors: Jürgen Kockmann, Gronau (DE); Uwe Sydon, Düsseldorf (DE); Hermann-Josef Terglane, Heek (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/446,752

(22) PCT Filed: Dec. 30, 1998

(86) PCT No.: PCT/DE97/01731

§ 371 (c)(1),
(2), (4) Date: May 30, 2000

(87) PCT Pub. No.: WO98/59437

PCT Pub. Date: Dec. 30, 1998

(51) Int. Cl.$^7$ .............................................. H04J 3/00
(52) U.S. Cl. ...................... 370/280; 370/294; 370/295; 370/330; 370/343
(58) Field of Search ............................... 370/276, 277, 370/279, 280, 281, 294, 295, 319, 321, 330, 370/337, 344, 347, 343, 345

(56) References Cited

U.S. PATENT DOCUMENTS

| 5,598,407 | A | * | 1/1997 | Bud et al. .................... | 370/330 |
| 5,841,766 | A | * | 11/1998 | Dent et al. ................... | 370/321 |
| 6,130,886 | A | * | 10/2000 | Ketseoglou et al. ........ | 370/347 |
| 6,347,082 | B1 | * | 2/2002 | Kranz et al. ................ | 370/337 |
| 6,411,611 | B1 | * | 6/2002 | van der Tuijn ............. | 370/337 |

FOREIGN PATENT DOCUMENTS

EP          0 767 551          4/1997          ............ H04B 7/26

OTHER PUBLICATIONS

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT-Standards," pp. 23-29.
IEEE Personal Communications, 2$^{nd}$ Quarter, (1994), No. 2, New York, Phillip D. Rasky, et al. "Slow Frequency—Hop TDMA/CDMA for Macrocellular Personal Communications", pp. 26-35.

* cited by examiner

*Primary Examiner*—Dang Ton
*Assistant Examiner*—Shick Hom
(74) *Attorney, Agent, or Firm*—Bell, Boyd & Lloyd LLC

(57) ABSTRACT

The present invention relates to a radio inter-face for a cordless small system using the 2.4 GHz ISM band. According to the present invention, a transmission system having a fixed station (1) and at least one mobile station (2, 3) is provided for this purpose, the fixed station (1) and the mobile station (2) each having devices (RF modules 4, 5) in order to transmit the data in time slots using a frequency-division multiplex method (FDMA) and a time-division multiplex method (TDMA), and with time division duplexing (TDD). As is known from DECT Standard, the data are modulated onto a carrier frequency ($f_x$) using a GMSK modulation method. The RF modules (4, 5) in the fixed station (1) and, respectively, the mobile station (2) are in this case designed such that the carrier frequency ($f_x$) is changed after a predetermined time period, which may correspond, for example, to the time duration of a time slot or of a transmission frame. A transmission frame in this case contains 16 time slots.

12 Claims, 2 Drawing Sheets

Figure 3:
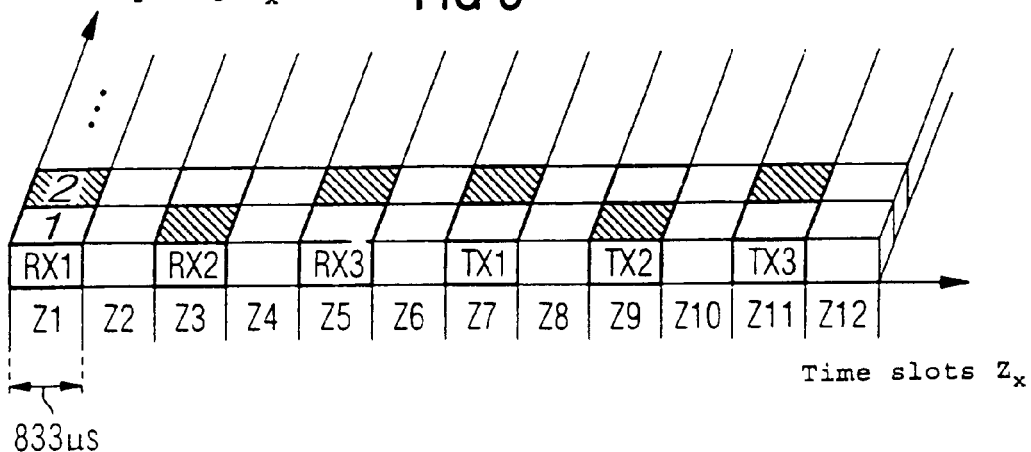

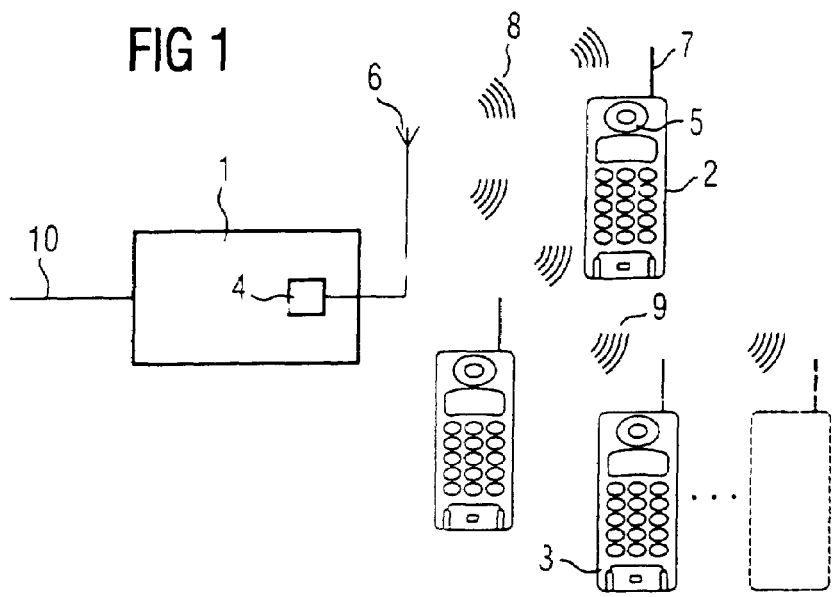
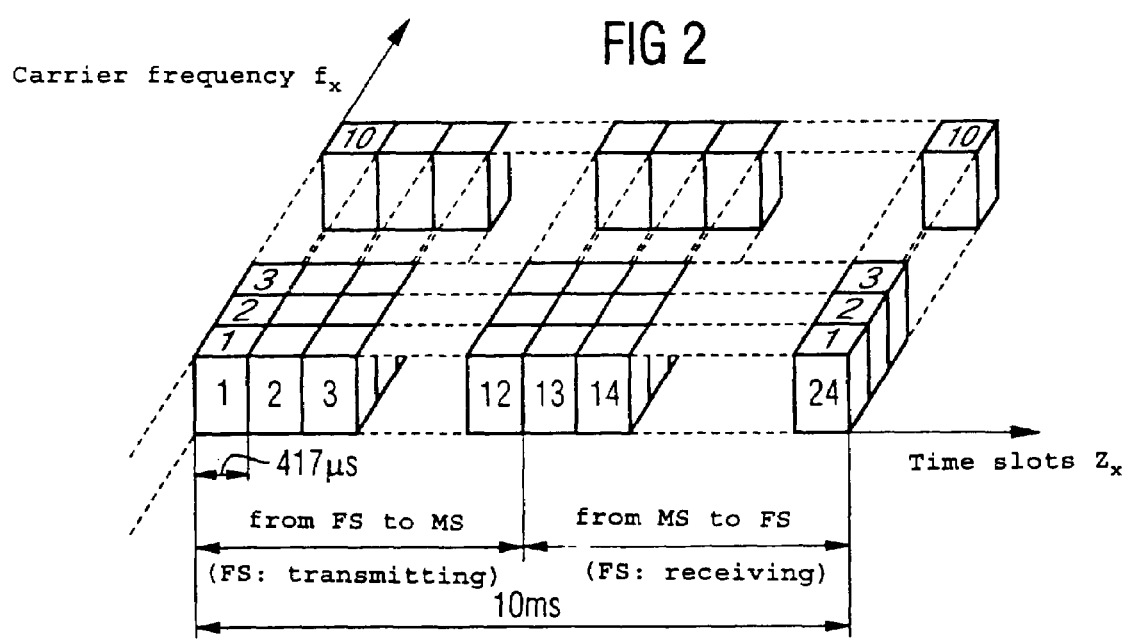

RADIO INTERFACE FOR A SMALL WIRELESS INSTALLATION IN THE 2.4 GHZ ISM BAND

The present invention relates to a method and a transmission system according to the precharacterizing clause of the independent claims. According to the invention, a radio interface is provided for a cordless small system using the 2.4 GHz ISM band.

The DECT Standard was adopted at the start of the 1990's in order to replace the various existing analogue and digital Standards in Europe. This is the first common European Standard for cordless telecommunications. A DECT network is a microcellular, digital mobile radio network for high subscriber densities. It is primarily designed for use in buildings. However, it is also possible to use the DECT Standard outdoors. The capacity of the DECT network of around 10,000 subscribers per square kilometer provides, from the cordless standard, ideal access technology for network operators. According to the DECT Standard, it is possible to transmit both voice and data signals. Thus, cordless data networks can also be built on a DECT base.

The DECT Standard will be explained in more detail in the following text with reference to FIG. 2. A digital, cordless telecommunications system has been standardized for Europe under the designation DECT (Digital Enhanced Cordless Telecommunication). In conjunction with the switching function of a telecommunications installation, this system is therefore suitable for mobile telephone and data traffic in an office building or on a commercial site. The DECT functions supplement a telecommunications installation, and thus make it the fixed station FS of the cordless telecommunications system. Digital radio links between the fixed station FS and a maximum of 120 mobile stations MS can be produced, monitored and controlled on up to 120 channels.

A maximum of ten different carrier frequencies (carriers) are used for transmission in the frequency range from 1.88 GHz to 1.9 GHz. This frequency-division multiplex method is called FDMA (Frequency Division Multiple Access).

Twelve channels are transmitted successively in time on each of the ten carrier frequencies using the time-division multiplex method TDMA (Time Division Multiple Access). Cordless telecommunication in accordance with the DECT Standard using ten carrier frequencies with in each case twelve channels provides a total of 120 channels. Since one channel is required, for example, for each voice link, there are 120 links to the maximum of 120 mobile stations MS. The duplex method (TTD) is used on the carriers. Once the twelve channels (channels 1–12) have been transmitted from the fixed station, it switches to receive and receives twelve channels (channels 13–24) in the opposite direction from at least one mobile station.

A time-division multiplex frame thus comprises 24 channels (see FIG. 2). In this case, channel 1 to channel 12 are transmitted from the fixed station FS to the mobile stations MS, while channel 13 to channel 24 are transmitted in the opposite direction, from the mobile stations MS to the fixed station FS. The frame duration is 10 ms. The duration of a channel (time slot) is 417 µs. 320 bits of information (for example voice) and 104 bits of control data (synchronization, signalling and error check) are transmitted in this time. The useful bit rate for a subscriber (channel) results from the 320 bits of information within 10 ms. It is thus 32 kilobits per second.

Integrated modules have been developed to carry out the DECT functions for fixed and mobile stations. In this case, the fixed station and the mobile station carry out similar functions. One of these said integrated modules is in this case the RF module, that is to say the module which carries out the actual function of receiving and transmitting in the RF band.

It is known for so-called fast hopping RF modules to be used, that is to say RF modules which can carry out a change in the carrier frequency from one time slot or channel to the next. These fast hopping RF modules are intrinsically very complex and costly. Thus, in practice, so-called slow hopping RF modules are mainly used, that is to say modules which require a certain amount of time to change the carrier frequency. In practice, the time period which the slow hopping RF module requires to change the carrier frequency corresponds essentially to the time period of a time slot. This means that, after each active time slot, that is to say after each slot in which data are transmitted, a so-called inactive time slot (blind slot) must follow, in which no data can be transmitted. This means that, in practice, only six links are available on one carrier frequency to the DECT Standard, instead of the twelve possible links.

A DECT channel is defined by its time slot and its carrier frequency. In this case, it should be noted that, according to the DECT Standard, the organization to re-use physical channels is carried out by means of dynamic channel selection. This means that there is no need for any complex frequency planning, as in cellular systems. To set up a link, the signal levels of all the channels are measured continuously, and the interference-free channels are controlled in a channel list (channel map). While a link exists, the signal levels of all the channels and the reception quality continue to be monitored. If this monitoring indicates that the channel currently being used has been transmitted at a carrier frequency which is subject to interference (for example as a result of the influence of a transmission at the same carrier frequency from or to another fixed station), another carrier frequency is automatically selected for the next active time slot, and is entered in the channel list as being interference-free.

As an alternative, a so-called frequency hopping method can also be used, in which the carrier frequency is changed after a predetermined time period, for example a transmission frame.

For nations outside Europe, the DECT Standard may need to be modified and matched to local conditions. For example, in the USA, the normal DECT band between 1.88 and 1.90 GHz cannot be used for transmission, and the generally accessible 2.4 GHz ISM band (Industrial, Scientific, Medical) is available instead of this. Furthermore, changes would have to be carried out for matching to the national Standards, such as the American Standard "FCC part 15" (Federal Communications Commission). This American Standard describes the transmission method, transmission powers and available bandwidth allowed for the radio interface.

In the DECT Standard, in addition to the 320 information bits mentioned above, each time slot also contains another 104 bits required for signal transmission, as well as 56 bits in the guard field, so that each time slot contains a total of 480 bits. This results in a data rate of (24×48 bits)/10 ms=)1 152 000 bits/s. A data rate at this level is pointless in the American ISM band, since the bandwidth required per usable channel would be too large. Despite these Standards, for cost reasons, it should be possible to continue to use components developed for the DECT Standard, such as the base band controller, with as little modification as possible.

The present invention thus has the object of providing a radio interface for a cordless small system using the 2.4 GHz ISM band, which allows components which were developed for the so-called DECT Standard to be used as far as possible.

The object is achieved by the features in the independent claims.

Thus, according to the invention, a method for wire-free transmission of data is provided, the data being transmitted in time slots using a frequency-division multiplex method, a time-division multiplex method and with time division duplexing (TDD). As is known from the DECT Standard, the data are modulated onto the respective carrier frequency in accordance with the GMSK modulation method. According to the invention, the carrier frequency is changed after a predetermined time period, this being called frequency hopping spread spectrum. According to the invention, a transmission frame still has 16 time slots.

Between 80 and 100 carrier frequencies can advantageously be used.

The data can be transmitted in a frequency band between 2.4 and 2.483 GHz, as is the case, for example, with the ISM band.

The predetermined time period after which the carrier frequency is changed in accordance with the frequency hopping spread spectrum method may correspond to a time slot or a transmission frame. The time period may also be an integer multiple of a time slot or of a time frame.

An active time slot in which data are transmitted can in each case be followed by an inactive time slot, in which no data are transmitted. The time duration of the inactive time slot may be half the time duration of the active time slots.

The setting (programming) of the carrier frequency for the respective next active time slot can be carried out during the inactive time slots.

According to the invention, a transmission system for wire-free transmission of data is also provided, the transmission system having a transmitter and a receiver. The transmitter and the receiver in turn each have devices for transmitting data in time slots using a frequency-division multiplex method (FDMA), a time-division multiplex method (TDMA) and with time division duplexing (TDD). The data are in this case modulated onto the carrier frequency, and demodulated, in accordance with a GMSK modulation method. According to the invention, the transmitter and the receiver are designed such that the carrier frequency is changed after a predetermined time period. One transmission frame contains 16 time slots.

Between 80 and 100 carrier frequencies can advantageously be provided.

A frequency band between 2.4 and 2.4835 GHz can be provided for transmitting the data. The predetermined time period after which the carrier frequency is changed can be set to the time duration of a time slot or, alternatively, of a transmission frame. The time period may also be an integer multiple of a time slot or of a time frame.

After an active time slot in which data are transmitted, an inactive time slot can in each case be provided, in which no data are transmitted.

The time duration of the inactive time slots may be chosen to be half the time duration of the active time slots.

An RF module can be provided in each case in the transmitter and the receiver, it being possible to select the carrier frequency of an active time slot of the RF module in each case during the preceding inactive time slot.

Figure 4:
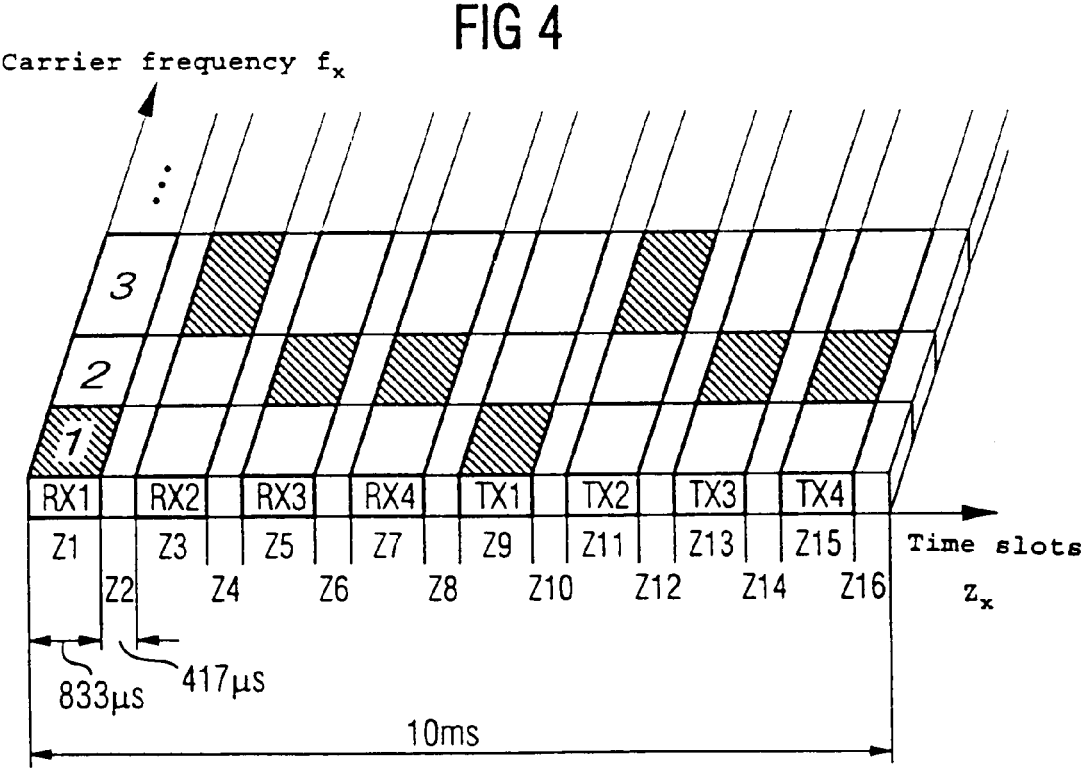

The invention will now be explained in more detail using an exemplary embodiment and with reference to the accompanying drawings, in which:

FIG. 1 shows an arrangement according to the invention for digital radio transmission of data, FIG. 2 shows a schematic illustration of the known DECT Standard, FIG. 3 shows a schematic illustration of the channel allocation for matching the known DECT Standard to the American ISM band, FIG. 4 shows a particularly effective allocation of the channels from the DECT Standard matched to the ISM band, according to the invention.

FIG. 1 shows an arrangement for digital radio transmission of data. A fixed station 1 is in this case connected to the fixed network by means of a terminal line 10. The fixed station 1 has an RF module 4, using which data can be transmitted and received by means of an antenna 6. The RF module 4 may be, in particular, a so-called slow hopping RF module, that is to say a particularly cost-effective RF module, which intrinsically requires a certain period of time to change from one carrier frequency to another carrier frequency. This time period is in the order of magnitude of a time slot, that is to say between about 100 $\mu$s and 1 ms, and, in particular, between about 300 $\mu$s and 500 $\mu$s. This time period required for the carrier frequency change may correspond, for example, to the time period which is filled by a time slot in a time-division multiplex method (TDMA). By means of the antenna 6, a radio transmission may be made via a radio transmission path 8 to a mobile station 2, or a radio transmission may be made to a mobile station (cordless telephone) 3 via a second radio transmission path 9. All the mobile stations illustrated in FIG. 1 are of the same design, so that a more detailed explanation will be given only on the basis of the illustrated mobile station 2.

As can be seen in FIG. 1, this mobile station 2 has an antenna 7 for receiving and for transmitting data from and, respectively, to the fixed station 1. The mobile station 2 contains an RF module 5, which essentially corresponds to the RF module 4 used in the fixed station 1. The RF module 5 of the mobile station 2 may thus also be a so-called slow hopping RF module.

It is now intended to explain, with reference to FIG. 2, how the known DECT Standard can be matched to the American ISM band. As already mentioned above, if the DECT Standard were retained, the resulting data rate would be too high for the ISM band. As can be seen in FIG. 3, the number of time slots per frame is for this reason halved, that is to say only 12 time slots Z1–Z12 are now provided in the ten milliseconds of a time frame instead of the 24 time slots (channels) in the DECT Standard, each of which 12 time slots can be used to transmit 480 bits. By halving the number of time slots, the data rate is also halved, in a corresponding manner, to (12×480 bits)/10 ms=576000 bits/s. This lower data rate results in a bandwidth that is acceptable for the American ISM band.

As can be seen, per se, in FIG. 3, it is necessary to provide so-called slow hopping RF modules in a cost-effective implementation of the equipment required for radio transmission, which means that each active time slot in which data are transmitted must be followed by an inactive time slot (blind slot), in which no data can be transmitted. If twelve time slots Z1–Z12 are provided (6 time slots Z1–Z6 for transmission from a fixed station to the mobile station and 6 time slots Z7–Z12 for transmission from the mobile station to a fixed station), then there is a maximum of only three possible links available. In an implementation using the cost-effective slow hopping RF modules, the usable channel capacity is thus not very great as a result of the regulation by the slow hopping RF module to a maximum of three links.

Possible active time slots are illustrated shaded in FIG. 3. For example, as illustrated, transmission from the fixed station 1 to a mobile station 2. 3 can be made at the carrier frequency $f_2$ in the time slot Z1 (RX1). If this time slot Z1 is followed by a time slot Z2, in which no data transmission takes place (inactive time slot, blind slot), a slow hopping RF module can also use the time duration of the inactive time slot Z2 to change the carrier frequency. As illustrated in FIG. 3, the carrier frequency can be changed, for example, from the carrier frequency $f_2$ to the carrier frequency $f_1$. Thus, as illustrated in FIG. 3, a transmission can be made in the time slot Z3 from the fixed station to a mobile station, at the carrier frequency $f_1$ (RX2). The layout shown in FIG. 3 is thus distinguished by the fact that, with a given time slot distribution, an active time slot (illustrated shaded) can be operated at each of the predetermined carrier frequencies ($f_1$, $f_2$ . . . ).

It should be remembered that, according to the DECT Standard, the organization of re-use of physical channels is carried out by means of dynamic channel selection, a channel being defined by its carrier frequency and its time slot. There is thus no need for any complex frequency planning, as in cellular systems. To set up links, the signal levels of all the channels are measured continuously, and the interference-free channels are controlled in a channel list (channel map). During a link, the signal levels of all the channels of all the possible carrier frequencies, and the reception quality, continue to be monitored.

Thus, as illustrated in FIG. 3, if it is found in the time slot Z1 when transmitting (RX1) at the carrier frequency $f_2$ that the reception or transmission conditions are better at the carrier frequency $f_1$, then it is possible to change, during the time duration of the time slot Z2 in which no data transmission is taking place, to the carrier frequency 1 which has been identified as being better. The transmission RX2 takes place during the time slot Z3 at the carrier frequency $f_2$ which has been found to be better.

As a preferred alternative to this approach, in which a carrier frequency is changed only in the event of a disturbance, a so-called frequency hopping method (frequency hopping spread spectrum) can also be used, in which the carrier frequency is changed after a predetermined time period, for example a transmission frame or a transmission time slot, irrespective of whether the currently used carrier frequency is or is not subject to interference. The transmitted energy can thus be distributed over a plurality of carrier frequencies which, overall, leads to less adverse effect on other systems within the transmitter range.

Care must be taken in this case to ensure that all the carrier frequencies are, on average, used equally often, in accordance with the Standard "FCC part 15".

As already stated, the channel allocation scheme illustrated in FIG. 3 has the disadvantage that, since the number of time slots per time frame is halved to 12, as a result of which the duration of a time slot is doubled to 833 µs, and as a result of the necessity for the inactive time slots after each active time slot, this results in only three possible links (three links from a fixed station to a mobile station and three links from a mobile station to a fixed station) being available, in contrast to the six possible links according to the DECT Standard.

FIG. 4 illustrates a time slot structure which allows the maximum possible number of links to be increased from three to four without there being any negative effect on flexible selection of the carrier frequencies from one active time slot to the next active time slot and without the programming of the synthesizers of the RF modules 4, 5 being adversely effected. As can be seen in FIG. 4, this increase in the maximum number of links from three to four is essentially achieved by the time duration of an inactive slot, during which no data transmission takes place, being shortened in comparison with the time duration of an active time slot. As is shown in FIG. 4, the time duration of an active time slot Z1, Z3, Z5, Z7, Z9, Z11, Z13 and Z15 in a time frame is in each case 833 µs, if the time frame lasts for 10 ms overall. The time duration of the inactive time slots Z2, Z4, Z6, Z8, Z10, Z12, Z14 and Z16 is only 417 µs, as illustrated in FIG. 4, and is thus essentially only half the time duration of the active time slots. A slow hopping RF module known from DECT technology requires a time period of at least 417 µs after an active time slot, in order to carry out frequency programming for the carrier frequency of the next time slot. Half a time slot of the DECT Standard matched to the ISM band, with a time duration of 833 µs/2=417 µs, is thus sufficient for an inactive time slot (blind slot).

As can be seen in FIG. 4, a data transmission RX1, for example, can be made during the time slot Z1 from the fixed station to a mobile station at a carrier frequency $f_1$. In order to allow the transmission to be made with a low bandwidth as well, the time duration of the time slot Z1 is in this case twice the time duration according to the DECT Standard, namely 833 µs. The time slot Z1 is followed by a non-active time slot Z2, whose time duration is only 417 µs. This time period of 417 µs is intrinsically sufficient for an RF module using the slow hopping technique to program the carrier frequency for the next active time slot Z3. If it is thus found that, for example, the carrier frequency $f_3$ offers better reception conditions than the carrier frequency $f_1$, the carrier frequency [lacuna] from the carrier frequency $f_1$ in time slot Z1 to the carrier frequency $f_3$ for the time slot Z3 can take place during the time duration of the time slot Z2 during which no data transmission takes place, and a transmission from a fixed station to a mobile station can thus take place during the time slot Z3 (RX3).

The illustrated example shows the case where the carrier frequency $f_x$ is not changed for transmission between a fixed station and a specific mobile station.

As an alternative, of course, a so-called frequency hopping method can also be used, in which the carrier frequency is changed after a predetermined time period, for example a transmission frame.

After eight time slots Z1 to Z8, which correspond to half the time slots Z1 to Z16 in a time frame of 10 ms, the mobile station or stations transmit to the fixed station using the duplex method (TTD). For example, a mobile station can transmit (TX1) to the fixed station at a carrier frequency $f_1$ during the time slot Z9. The inactive time slot Z10 following the active time slot Z9 once again lasts for only half the time duration of the active time slot Z9 (833 µs), namely 417 µs. The time duration of the inactive half time slot Z10 is in turn sufficient for the RF module to carry out the frequency programming for the next active time slot Z11, for a further transmission from a mobile station to the fixed station (TX2).

The following table shows details of the parameters of the radio interface according to the invention, as they have been determined as being particularly advantageous:

| | |
|---|---|
| Frequency band | 2.4–2.4835 GHz ISM band |
| Transmission method | Frequency Hopping Spread Spectrum |
| Access method | FDMA/TDMA |
| Duplex method | TDD |
| Number of carrier frequencies | 96 |
| Carrier frequency separation | 0.864 MHz |
| Carrier frequencies (MHz) | $f_n = 2401.056 + n \times 0.864$, where $n = 0 \ldots 95$ |
| Number of carrier frequencies | 96 |
| Maximum number of channels | 384 |
| Number of channels which can be allocated simultaneously | 4 |
| Transmitted power (peak) | 250 mW (up to 1 watt possible) |
| Range | as DECT ($\approx 300$ m) |
| Modulation method | GMSK ($B \times T = 0.5$) |
| Frame length | 10 ms (5 ms Rx, 5 ms Tx) |
| Number of time slots per Uplink/Downlink | 4 full slots (active time slots) 4 half slots (inactive time slots for setting the synthesizers in the RF modules) |
| Bit rate | 576 kbits/s |

According to the invention, a radio interface is thus provided in particular for the 2.4 GHz band which, taking account of the Standards applicable to this band (FCC part 15), is based on the DECT Standard such that it can be implemented, for example, with the aid of only insignificantly modified DECT base band controllers and RF modules.

LIST OF REFERENCE SYMBOLS

1: Fixed station
2: Mobile station (cordless telephone)
3: Mobile station
4: RF module, fixed station
5: RF module, mobile station
6: Antenna, fixed station
7: Antenna, mobile station
8: First radio transmission path
9: Second radio transmission path
10: Terminal line
Zx: Time slots
$f_x$: Carrier frequency

We claim:

1. A method for wire-free transmission of data, said method comprising:
    transmitting data in time slots using frequency-division multiplexing, time-division multiplexing and with time division duplexing, a transmission frame having 16 time slots;
    modulating said data onto a carrier frequency using a Gaussian Minimum Shift Keying GMSK modulation; and
    changing said carrier frequency after a predetermined time period;
    wherein an active time slot in which said data is transmitted is followed in each case by an inactive time slot in which no data is transmitted.

2. The method according to claim 1, wherein between 80 and 100 carrier frequencies are used.

3. The method according to claim 1, wherein said data is transmitted in a frequency band between 2.4 GHz and 2.4835 GHz.

4. The method according to claim 1, wherein said predetermined time period after which said carrier frequency is changed corresponds to one of the time slot, the transmission frame, and an integer multiple of one of the time slot and the transmission frame.

5. The method according to claim 1, wherein a time duration of said inactive time slots is half a time duration of said active time slots.

6. The method according to claim 1, wherein a carrier frequency for a next active time slot is changed during a presently transmitting inactive time slot.

7. A transmission system for wire-free transmission of data, said transmission system comprising:
    a fixed station having a first transmitter for transmitting using frequency-division multiplexing, and time-division multiplexed data, and with time division duplexing, and for modulating said data onto a carrier frequency, and for demodulating said data using a Gaussian Minimum Shift Keying GMSK modulation, and for changing said carrier frequency after a predetermined time period, and sixteen transmitted time slots being a transmission frame and an active time slot, in which said data is transmitted, being in each case followed by an inactive time slot in which no data is transmitted; and
    at least one mobile station having a second transmitter for transmitting data in time slots using the frequency-division multiplexing, and the time-division multiplexed data and with time division duplexing, and for modulating said data onto the carrier frequency and for demodulating said data using the Gaussian Minimum Shift Keying GMSK modulation, and for changing said carrier frequency after the predetermined time period, and sixteen transmitted time slots being the transmission frame, and the active time slot, in which said data is transmitted, being in each case followed by the inactive time slot in which not data is transmitted.

8. The transmission system according to claim 7, wherein between 80 and 100 carrier frequencies are provided.

9. The transmission system according to claim 7, wherein a frequency band of between 2.4 GHz and 2.4835 GHz is provided for transmission of said data.

10. The transmission system according to claim 7, wherein said predetermined time period after which said carrier frequency is changed is set to one of the time duration of a time slot, of the transmission frame, and of an integer multiple of one of the time slot and the transmission frame.

11. The transmission system according to claim 7, wherein a time duration of inactive time slots is half a time duration of active time slots.

12. The transmission system according to claim 7, wherein said first transmitter is further configured for selecting the carrier frequency of the active time slot in each case during a preceding inactive time slot; and wherein said second transmitter is further configured for selecting the carrier frequency of the active time slot in each case during a preceding inactive time slot.

* * * * *